US012663704B2

(12) United States Patent
Liu et al.

(10) Patent No.: US 12,663,704 B2
(45) Date of Patent: Jun. 23, 2026

(54) IMAGE CAPTURING MODULE AND ELECTRONIC DEVICE

(71) Applicant: LARGAN INDUSTRIAL OPTICS CO., LTD., Taichung City (TW)

(72) Inventors: Ti Lun Liu, Taichung City (TW);
Kai-Chien Hsu, Taichung City (TW);
Chien Yen Chen, Taichung City (TW);
Yi Ying Wu, Taichung City (TW);
Hsiu-Yi Hsiao, Taichung City (TW);
Ming-Ta Chou, Taichung City (TW)

(73) Assignee: LARGAN INDUSTRIAL OPTICS CO., LTD., Taichung City (TW)

( * ) Notice: Subject to any disclaimer, the term of this patent is extended or adjusted under 35 U.S.C. 154(b) by 181 days.

(21) Appl. No.: 18/769,210

(22) Filed: Jul. 10, 2024

(65) Prior Publication Data

US 2025/0180978 A1 Jun. 5, 2025

Related U.S. Application Data

(60) Provisional application No. 63/605,974, filed on Dec. 4, 2023.

(51) Int. Cl.
G03B 30/00 (2021.01)

(52) U.S. Cl.
CPC .................................. G03B 30/00 (2021.01)

(58) Field of Classification Search
CPC ........ H04N 23/50; H04N 23/51; H04N 23/54;
H04N 23/55; H04N 23/57; G03B 30/00;
H05K 1/181; H05K 1/182; H05K 1/189
See application file for complete search history.

(56) References Cited

U.S. PATENT DOCUMENTS

| 12,452,514 | B2 * | 10/2025 | Park | .................... | G02B 27/646 |
| 2014/0293558 | A1 * | 10/2014 | Lim | .................... | H05K 1/0215 |
| | | | | | 29/829 |
| 2018/0130750 | A1 * | 5/2018 | Jung | .................... | H10F 39/804 |
| 2020/0192064 | A1 * | 6/2020 | Li | .................... | G02B 6/4427 |
| 2021/0199858 | A1 * | 7/2021 | Jung | .................... | H04N 23/57 |

(Continued)

FOREIGN PATENT DOCUMENTS

CN 114388545 A 4/2022

OTHER PUBLICATIONS

TW Office Action dated Jul. 11, 2024 in application 113102775.

*Primary Examiner* — Kelly L Jerabek
(74) *Attorney, Agent, or Firm* — Maschoff Brennan

(57) ABSTRACT

An image capturing module includes an imaging lens system, an image sensor, a first circuit board, at least three passive components, and a second circuit board. The image sensor is at an image side of the imaging lens system and having a photosensitive area corresponding to the imaging lens system. The image sensor and the passive components are disposed on the first circuit board. Each passive component has a first lead and a second lead. The second circuit board corresponds to the first circuit board and includes a connector and multiple circuits electrically connected to the connector. The first leads and the image sensor are electrically connected and disposed on the first circuit board. The second leads form a contact on the first circuit board. The number of the contact is less than the number of the passive components. The contact is electrically connected to at least one circuit.

10 Claims, 11 Drawing Sheets

(56) References Cited

U.S. PATENT DOCUMENTS

| | | | |
|---|---|---|---|
| 2022/0116523 A1* | 4/2022 | Park | G02B 27/646 |
| 2022/0182516 A1* | 6/2022 | Lee | H04N 23/57 |
| 2023/0341647 A1* | 10/2023 | Chen | H04N 23/55 |
| 2024/0214660 A1* | 6/2024 | Park | H04M 1/02 |

* cited by examiner

IMAGE CAPTURING MODULE AND ELECTRONIC DEVICE

RELATED APPLICATIONS

This application claims priority to U.S. Provisional Application 63/605,974, filed on Dec. 4, 2023, which is incorporated by reference herein in its entirety.

BACKGROUND

Technical Field

The present disclosure relates to an image capturing module and an electronic device, more particularly to an image capturing module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Generally, the image sensor of an optical system is disposed on one circuit board, while other components, such as capacitors, resistors, inductors, transformers, and various passive and active electronic components, are disposed on another circuit board. These components are electrically connected through multiple contacts on both of the circuit boards. However, with this configuration, there will be a large number of contacts on the two circuit boards, complicating integration of the two circuit boards and hindering improvements in manufacturing defect rates, consequently diminishing production efficiency. Moreover, since the image sensor and the other electronic components are disposed on separate circuit boards, this separation tends to introduce a higher level of noise therebetween.

SUMMARY

According to one aspect of the present disclosure, an image capturing module includes an imaging lens system, an image sensor, a first circuit board and a second circuit board. Preferably, the image capturing module further includes at least three passive components. The image sensor is located at an image side of the imaging lens system, and the image sensor has a photosensitive area disposed corresponding to the imaging lens system. The image sensor is disposed on the first circuit board. Preferably, the passive components are disposed on the first circuit board, and each of the passive components has a first lead and a second lead. The second circuit board is disposed corresponding to the first circuit board, and the second circuit board includes a connector and a plurality of circuits that are electrically connected to the connector. Preferably, the first leads of the passive components and the image sensor electrically connected and together disposed on the first circuit board. Preferably, the second leads of the passive components form at least one contact on the first circuit board. The number of the at least one contact is less than the number of the at least three passive components, and the contact is electrically connected to at least one of the circuits of the second circuit board.

According to another aspect of the present disclosure, an image capturing module includes an imaging lens system, an image sensor, a first circuit board and a second circuit board. Preferably, the image capturing module further includes at least three electronic components. The image sensor is located at an image side of the imaging lens system, and the image sensor has a photosensitive area disposed corresponding to the imaging lens system. The image sensor is disposed on the first circuit board. Preferably, the electronic components are disposed on the first circuit board, and each of the electronic components has a first lead and a second lead. The second circuit board is disposed corresponding to the first circuit board, and the second circuit board includes a connector and a plurality of circuits that are electrically connected to the connector. Preferably, the first leads of the electronic components and the image sensor are electrically connected and together disposed on the first circuit board. Preferably, the second leads of the electronic components form at least one contact on the first circuit board. The number of the at least one contact is less than the number of the at least three electronic components, and the contact is electrically connected to at least one of the circuits of the second circuit board.

According to another aspect of the present disclosure, an electronic device includes one of the aforementioned image capturing modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
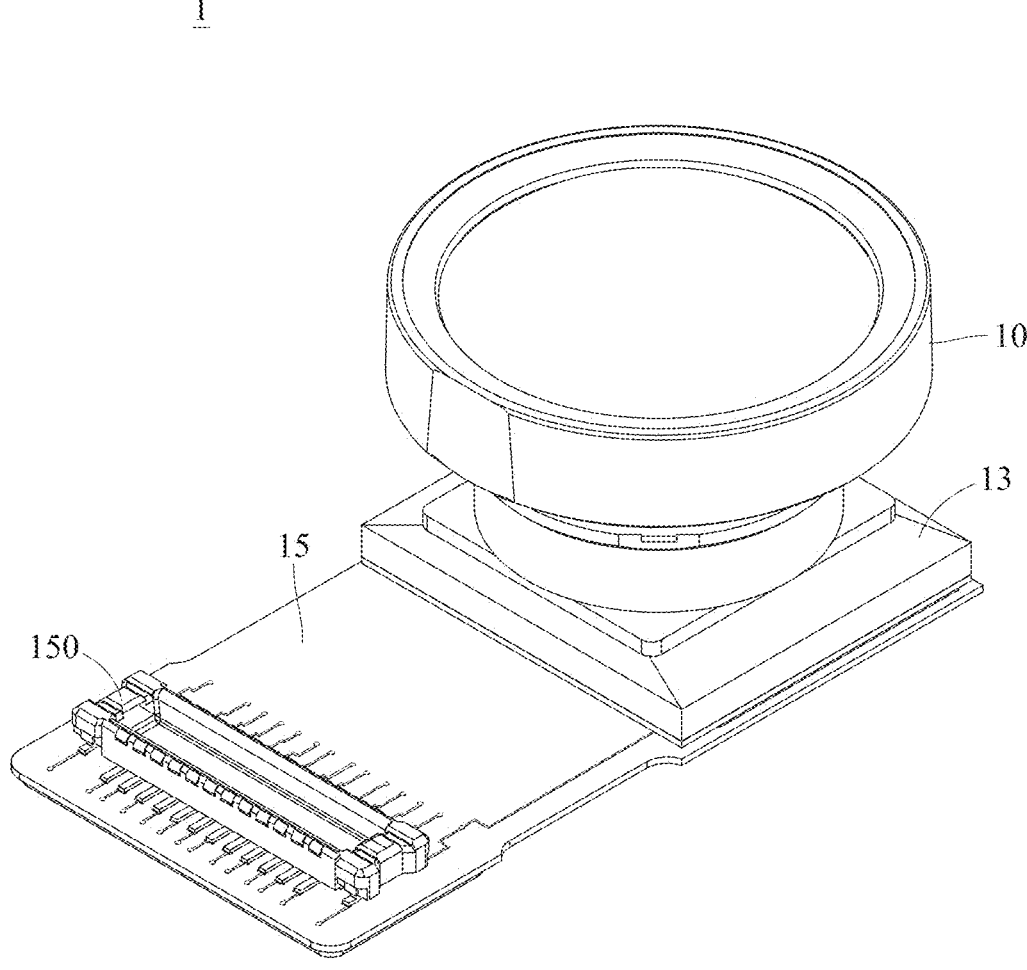
FIG. 1 is a perspective view of an image capturing module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an image capturing module. The image capturing module includes an imaging lens system, an image sensor, a first circuit board, at least three electronic components and a second circuit board.

The image sensor is located at an image side of the imaging lens system, and the image sensor has a photosensitive area disposed corresponding to the imaging lens system. In addition, the image sensor is disposed on the first circuit board, and the image sensor can be located on an image surface of the imaging lens system.

The electronic components are disposed on the first circuit board, and each of the electronic components has a first lead and a second lead. Furthermore, the electronic components can be, for example, passive components or active components, and the present disclosure is not limited thereto. Additionally, the passive components can be, for example, resistors, capacitors, inductors, or transformers, and the active components can be, for example, transistors, diodes, or integrated circuits (IC). Moreover, when the number of the electronic components is N, the following condition can be satisfied: $3 \leq N \leq 600$. The electronic components can be, for example, pin through-hole components or surface-mount components. When the electronic component is a pin through-hole component, the first lead and the second lead of the electronic component can be pin-type leads. When the electronic component is a surface-mount component, the first lead and the second lead of the electronic component can be terminal electrodes, and the present disclosure is not limited thereto.

The second circuit board is disposed corresponding to the first circuit board, and the second circuit board includes a connector and a plurality of circuits that are electrically connected to the connector. Moreover, the first circuit board and the second circuit board can be, for example, integrated circuit (IC) substrates, printed circuit boards (PCB), or flexible printed circuit boards (FPC), and the present disclosure is not limited thereto.

The first leads of the electronic components and the image sensor are electrically connected and together disposed on the first circuit board. The second leads of the electronic components form at least one contact on the first circuit board, and the at least one contact on the first circuit board is electrically connected to at least one of the circuits of the second circuit board. Moreover, the first leads of the electronic components are, for example, electrically connected to the image sensor through several of circuits that are printed on the first circuit board, and the second leads of the electronic components are, for example, form the at least one contact on the first circuit board through one or more of the other circuits that are printed on the first circuit board. Moreover, the number of the at least one contact on the first circuit board is less than the number of the electronic components. In one exemplary configuration, the number of the electronic components is N, and the number of the contacts formed by the second leads on the first circuit board is N−1, where N is more than or equal to three. In this arrangement, the N−1 contacts are electrically connected to N−1 of the circuits of the second circuit board, respectively. In another exemplary configuration, the second leads of the electronic components form one contact on the first circuit board; that is, the number of the contact formed by the second leads on the first circuit board is one. In this arrangement, the one contact is electrically connected to one of the circuits of the second circuit board.

According to the present disclosure, by disposing the electronic components (e.g., passive components or active components) on the first circuit board and streamlining the circuit routing on the first circuit board for electrical connection to the second circuit board, the number of contacts between the first circuit board and the second circuit board can be minimized so as to decrease the complexity of pairing the first circuit board and the second circuit board, lower the manufacturing defect rate, and thereby enhance production efficiency. Furthermore, arranging the electronic components and the image sensor together on the first circuit board allows the electronic components and the image sensor to be in closer proximity, which aids in reducing noise.

Figure 6:
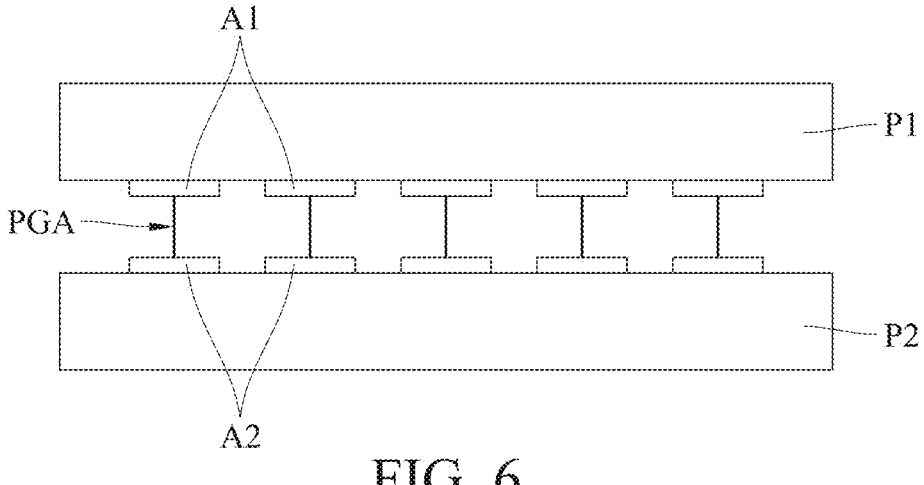
FIG. 6 to FIG. 8 are schematic views showing various connection configurations between contacts on a first circuit board and contacts on a second circuit board according to the present disclosure.
Figure 7:
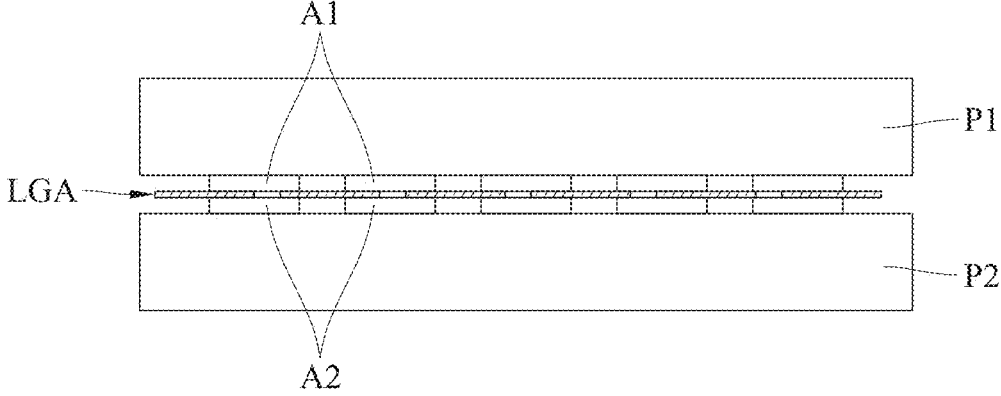
Figure 8:
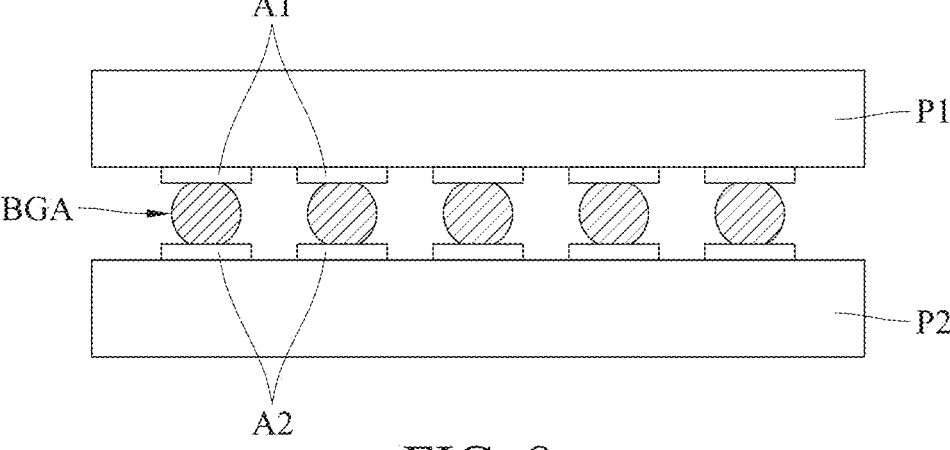

At least one of the circuits of the second circuit board can have at least one contact, and the contact(s) on the first circuit board formed by the second leads of the electronic components can be electrically connected to the at least one contact of the at least one of the circuit of the second circuit board. In addition, the at least one contact on the first circuit board can be connected to the at least one contact on the second circuit board, for example, through methods such as pin grid array (PGA), land grid array (LGA), or ball grid array (BGA) packaging, and the present disclosure is not limited thereto. Please refer to FIG. 6 to FIG. 8, which are schematic views showing various connection configurations between contacts on a first circuit board and contacts on a second circuit board according to the present disclosure. As shown in FIG. 6, the contacts A1 on the first circuit board P1 are connected to the contacts A2 on the second circuit board P2 through PGA packaging. As shown in FIG. 7, the contacts A1 on the first circuit board P1 are connected to the contacts A2 on the second circuit board P2 through LGA packaging. As shown in FIG. 8, the contacts A1 on the first circuit board P1 are connected to the contacts A2 on the second circuit board P2 through BGA packaging. Note that in FIG. 6 to FIG. 8, there are multiple contacts A1 on the first circuit board P1 and multiple contacts A2 on the second circuit board P2 as exemplary, but the present disclosure is not limited to the number of contacts. For example, in some exemplary configurations, the number of contact on the first circuit board can be one, and the number of contact on the second circuit board can be one.

The second leads of the electronic components can be grounded on the first circuit board. Therefore, by grounding multiple electronic components together on the first circuit board, it is favorable for streamlining wiring so as to reduce the number of contacts between the first circuit board and the second circuit board.

The second circuit board can further include a stiffener. The stiffener and the connector are disposed on opposite surfaces of the second circuit board, and the connector is disposed on a surface of the second circuit board that corresponds to the first circuit board. Therefore, the stiffener can enhance the rigidity of the second circuit board to support the connector. Moreover, the stiffener can be a metal component, thereby providing electromagnetic interference (EMI) shielding, but the present disclosure is not limited thereto.

In some exemplary configurations, there can also be one or more electronic components disposed on the second circuit board, but the present disclosure is not limited thereto.

In one exemplary configuration, the image capturing module can further include a mold compound, and the mold compound can be used for module encapsulation, packaging gold wires, solder points, and other components and modules together on the first circuit board to prevent exposure of these components, thereby avoiding the complication of subsequent manufacturing processes due to the exposure of components. Therefore, by using the mold compound to encapsulate the imaging lens system and the image sensor on the first circuit board, it can be made into a ready module, which allows the first circuit board to be quickly paired with the second circuit board corresponding thereto, thereby speeding up the manufacturing process.

According to the present disclosure, an electronic device is provided. The electronic device includes the aforementioned image capturing module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
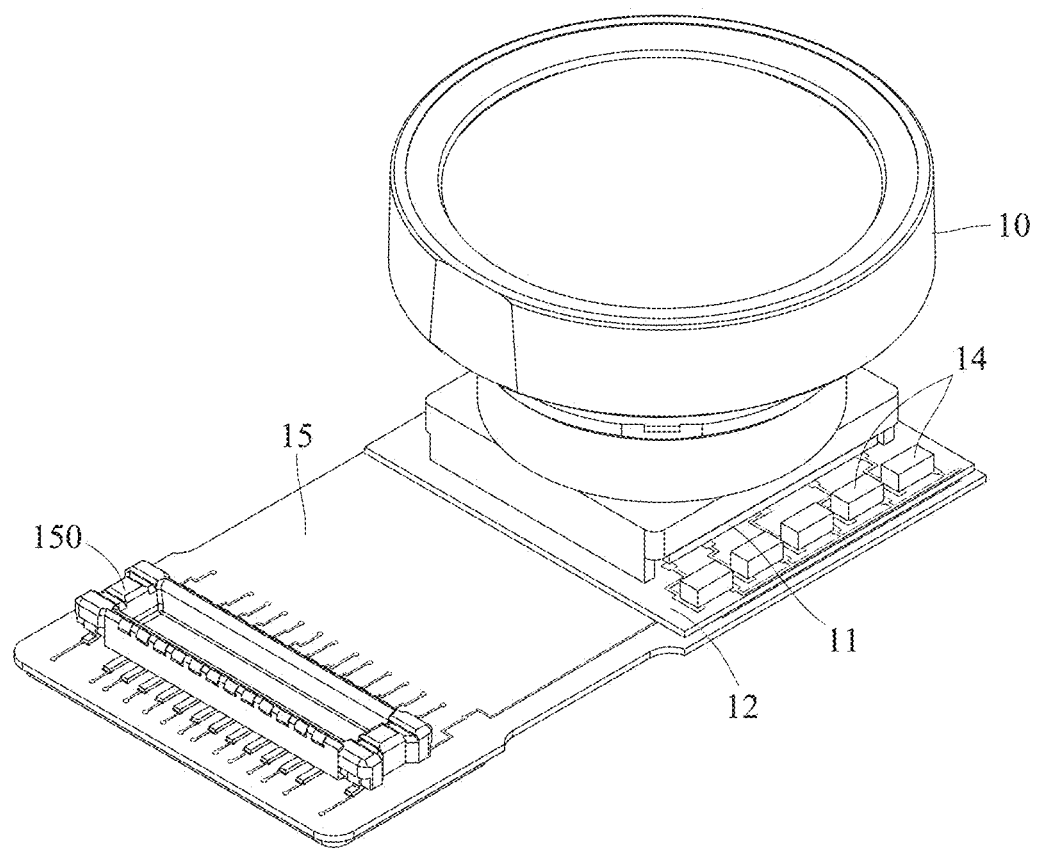
FIG. 2 is a perspective view of the image capturing module in FIG. 1 without a mold compound.
Figure 3:
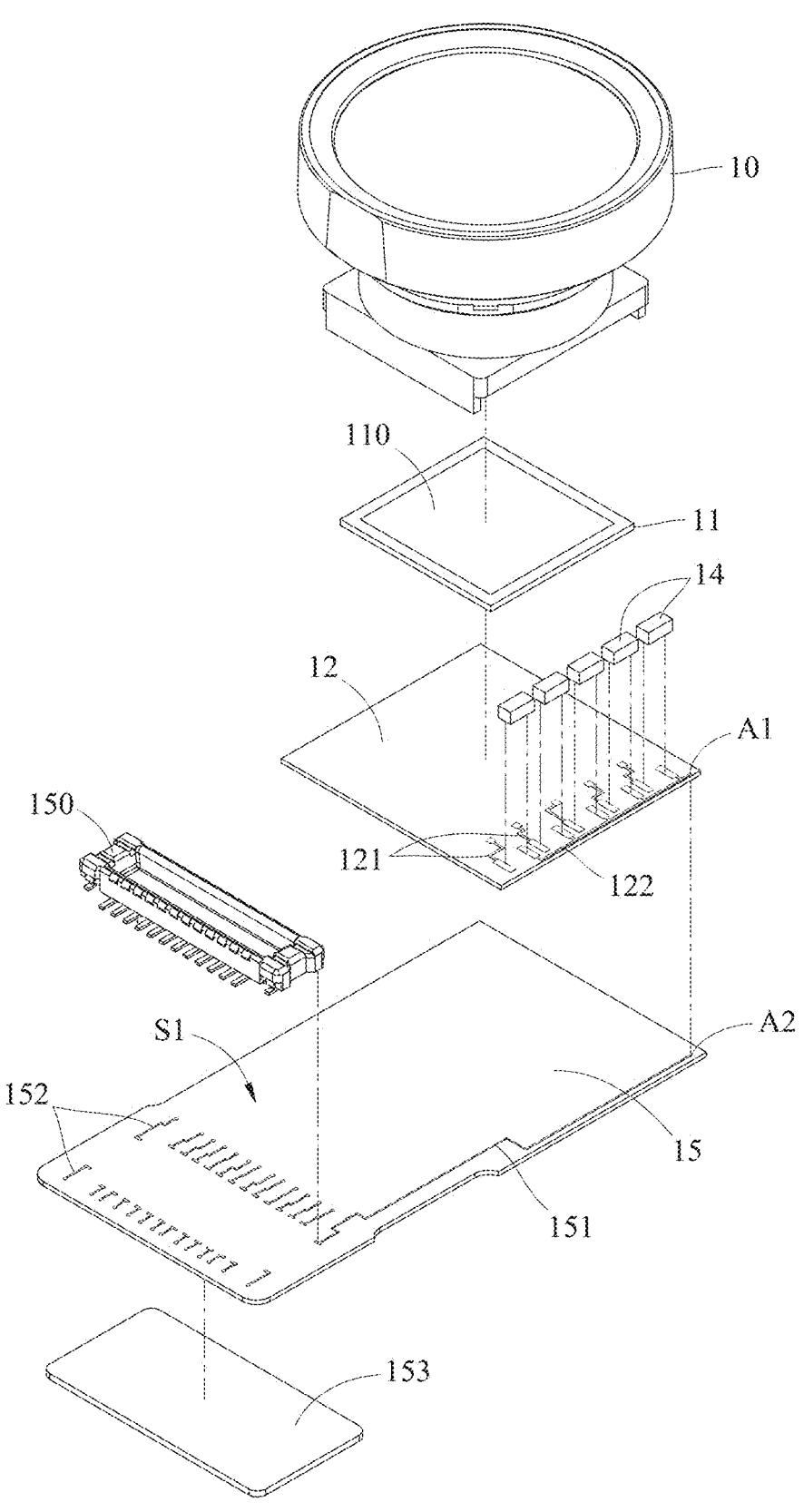
FIG. 3 is an exploded view of the image capturing module in FIG. 1 without the mold compound.
Figure 4:
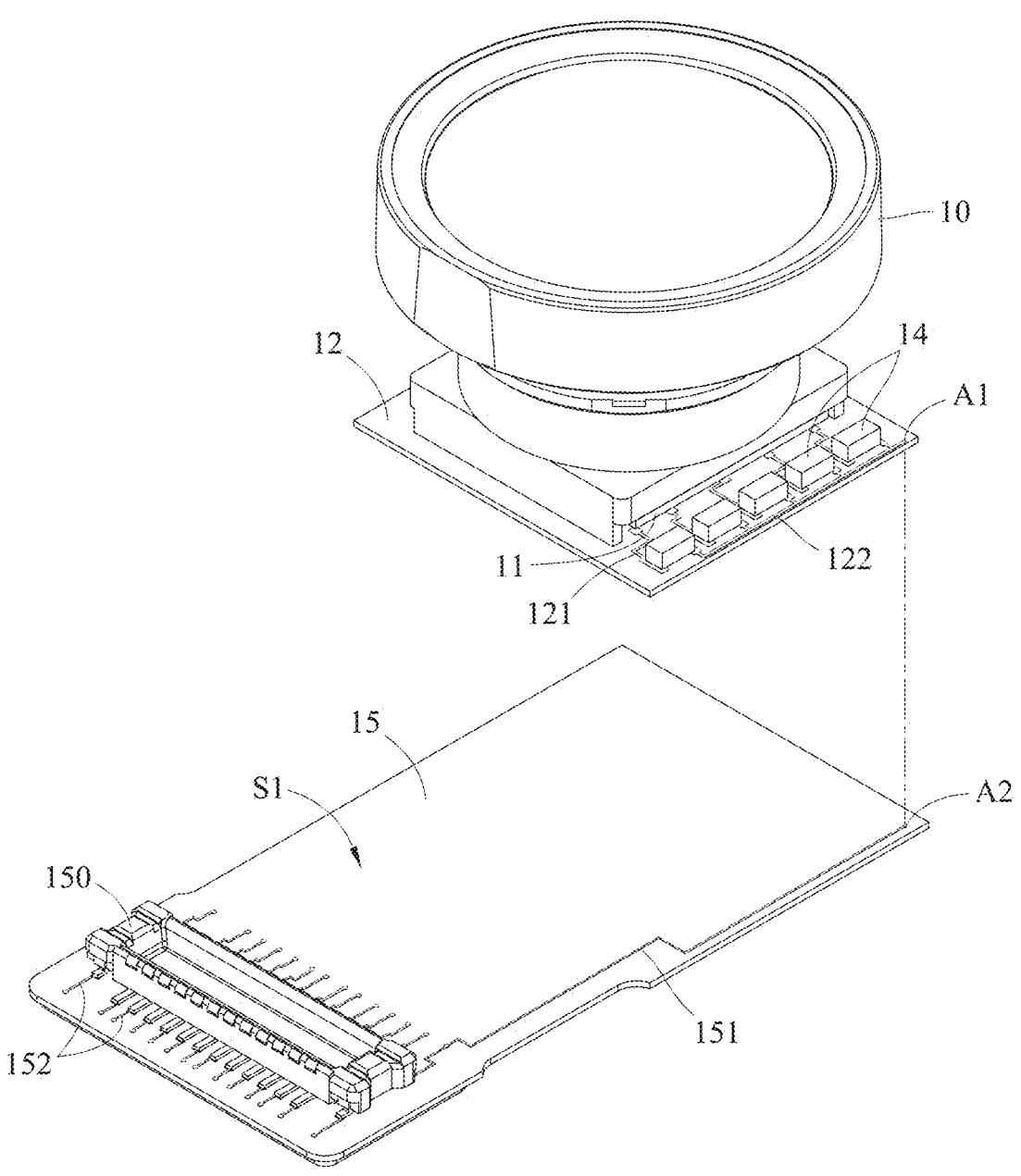
FIG. 4 is a partial exploded view of the image capturing module in FIG. 1 without the mold compound.
Figure 5:
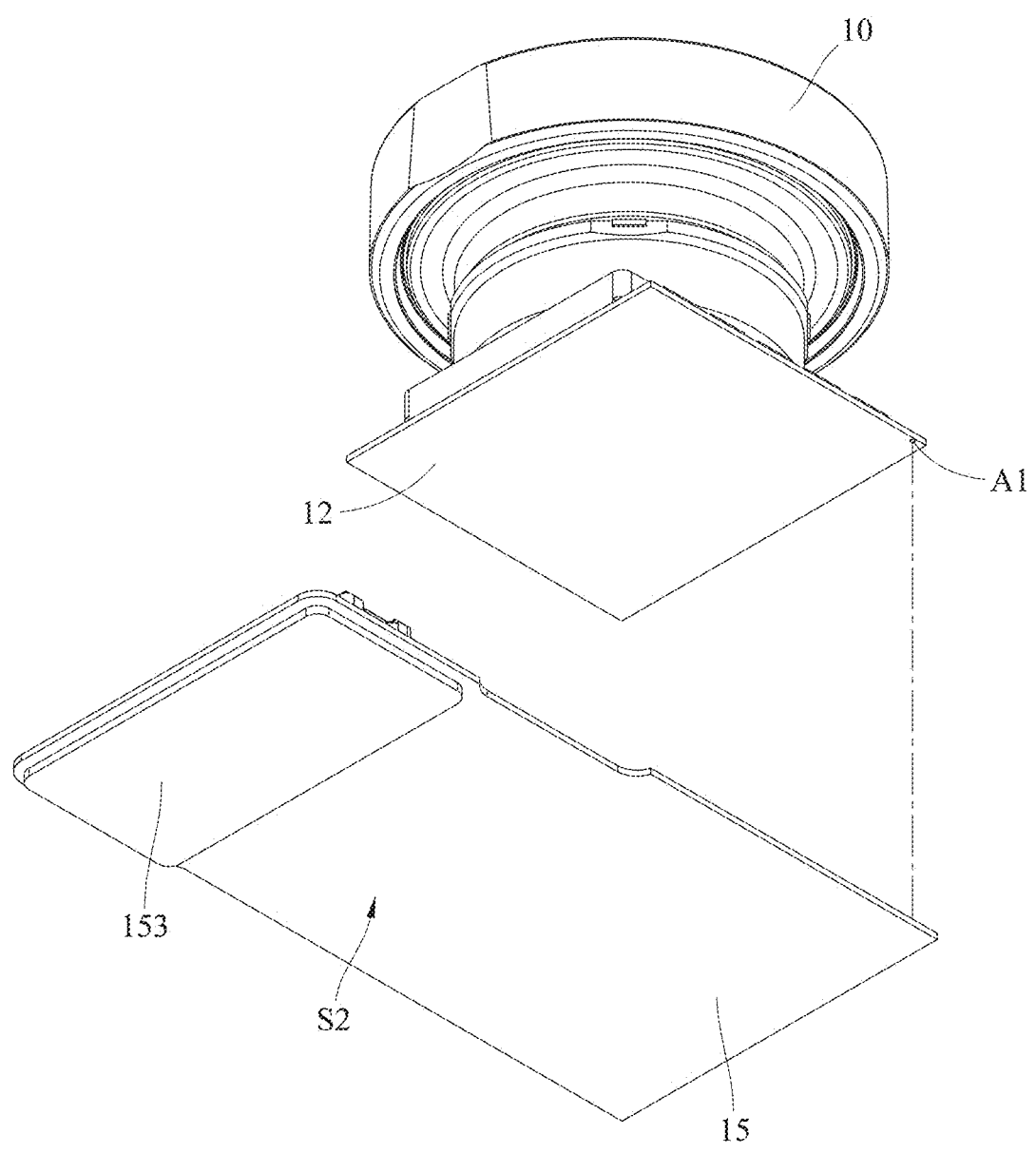
FIG. 5 is another partial exploded view of the image capturing module in FIG. 1 without the mold compound.

FIG. 1 is a perspective view of an image capturing module according to the 1st embodiment of the present disclosure, FIG. 2 is a perspective view of the image capturing module in FIG. 1 without a mold compound, FIG. 3 is an exploded view of the image capturing module in FIG. 1 without the mold compound, FIG. 4 is a partial exploded view of the image capturing module in FIG. 1 without the mold compound, and FIG. 5 is another partial exploded view of the image capturing module in FIG. 1 without the mold compound.

The image capturing module 1 includes an imaging lens system 10, an image sensor 11, a first circuit board 12, a mold compound 13, a plurality of electronic components 14 and a second circuit board 15.

The image sensor 11 is located at an image side of the imaging lens system 10, and the image sensor 11 has a photosensitive area 110 disposed corresponding to the imaging lens system 10. Moreover, the image sensor 11 is disposed on the first circuit board 12.

The mold compound 13 is molded onto the first circuit board 12 and physically contacts the imaging lens system 10, thereby stabilizing the relative position between the first circuit board 12 and the imaging lens system 10.

The electronic components 14 are disposed on the first circuit board 12, and each of the electronic components 14 has a first lead and a second lead (their reference numerals are omitted). Moreover, the electronic components 14 are passive components or active components.

The second circuit board 15 is disposed corresponding to the first circuit board 12, and the second circuit board 15 includes a connector 150, a plurality of circuits 151 and 152 that are electrically connected to the connector 150, and a stiffener 153. The stiffener 153 and the connector 150 are disposed on opposite surfaces S1 and S2 of the second circuit board 15, and the connector 150 is disposed on the surface S1 of the second circuit board 15 that corresponds to the first circuit board 12.

The first leads of the electronic components 14 are electrically connected to the image sensor 11 through circuits 121 on the first circuit board 12, and the first leads and the image sensor 11 are together disposed on the first circuit board 12. The second leads of the electronic components 14 are electrically connected to another circuit 122 on the first circuit board 12, and the second leads form one contact A1 on the first circuit board 12 through the circuit 122. Moreover, the second leads are grounded on the first circuit board 12.

One of the circuits 151 of the second circuit board 15 has a contact A2, and the contact A2 is electrically connected to the contact A1 on the first circuit board 12.

2nd Embodiment

Figure 9:
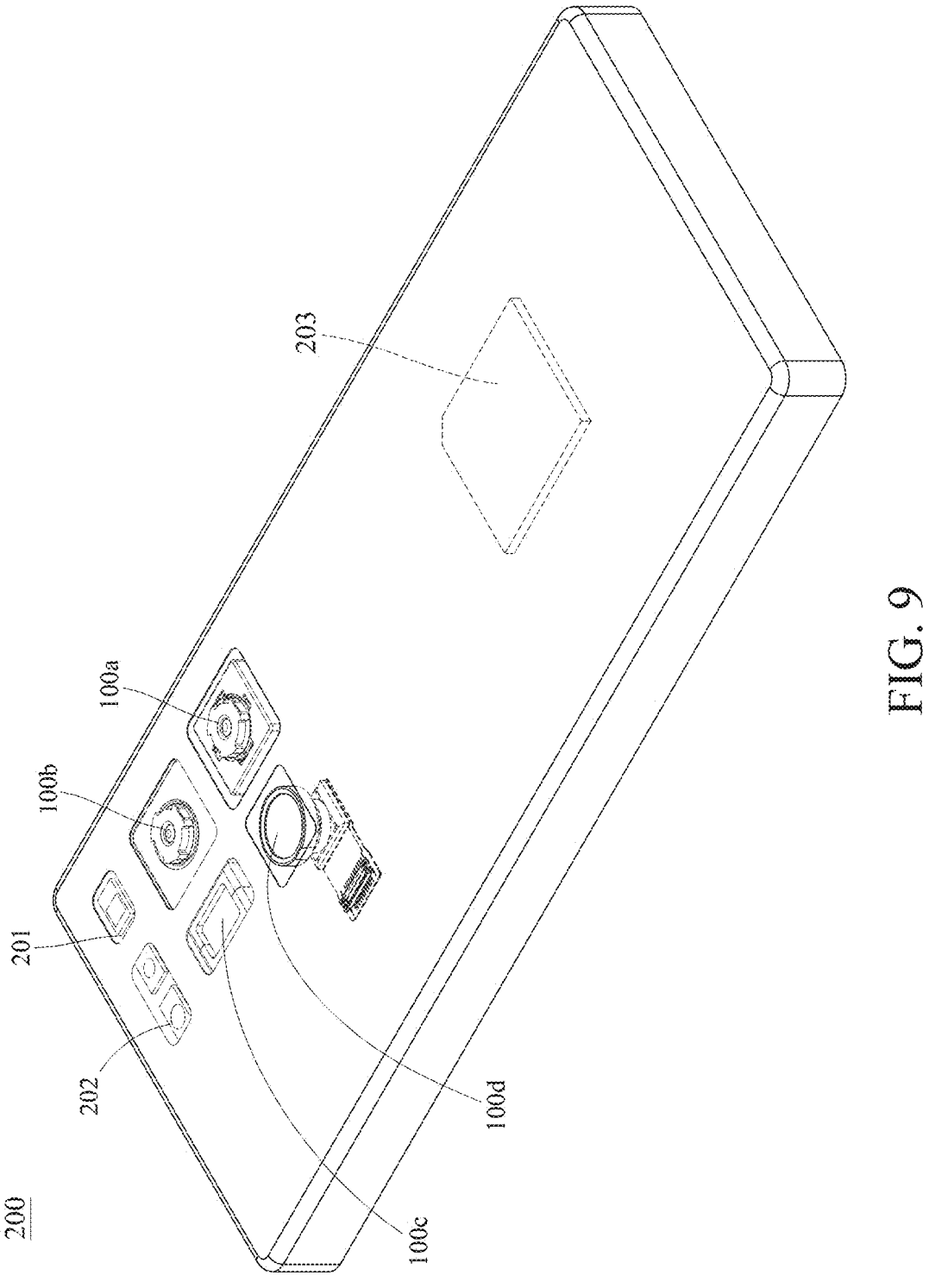
FIG. 9 is one perspective view of an electronic device according to the 2nd embodiment of the present disclosure.
Figure 10:
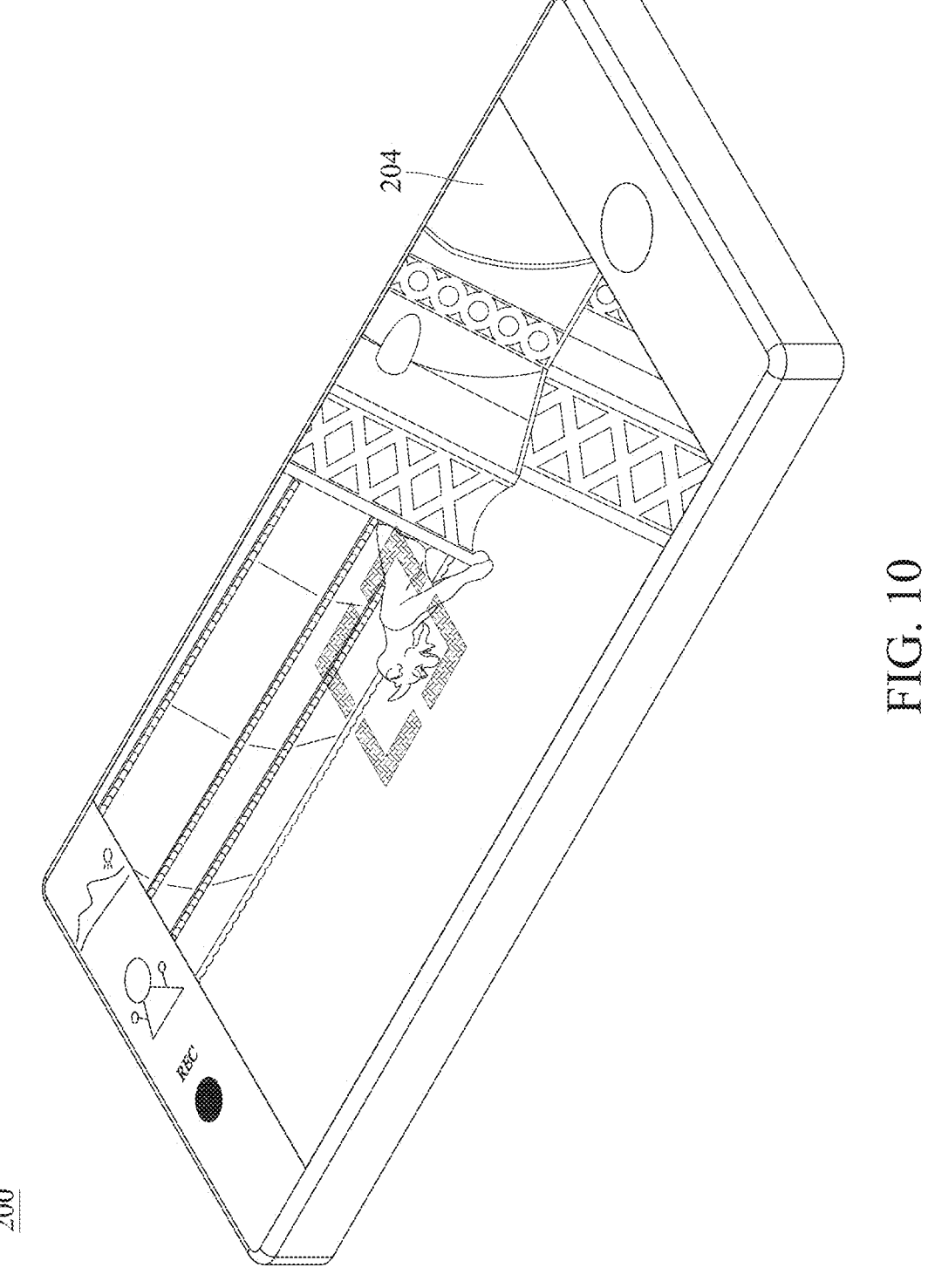
FIG. 10 is another perspective view of the electronic device in FIG. 9.

Please refer to FIG. 9 and FIG. 10. FIG. 9 is one perspective view of an electronic device according to the 2nd embodiment of the present disclosure, and FIG. 10 is another perspective view of the electronic device in FIG. 9.

In this embodiment, the electronic device 200 is a smartphone including a plurality of image capturing modules, a flash module 201, a focus assist module 202, an image signal processor 203, a display module (user interface) 204 and an image software processor (not shown).

These image capturing modules include an ultra-wide-angle image capturing module 100a, a high pixel image capturing module 100b, a telephoto image capturing module 100c and a telephoto image capturing module 100d. Moreover, the telephoto image capturing module 100d can be, for example, the image capturing module 1 as disclosed in the 1st embodiment of the present disclosure. The ultra-wide-angle image capturing module 100a, the high pixel image capturing module 100b and the telephoto image capturing module 100c can also be the image capturing module of the present disclosure, and the present disclosure is not limited thereto.

Figure 11:
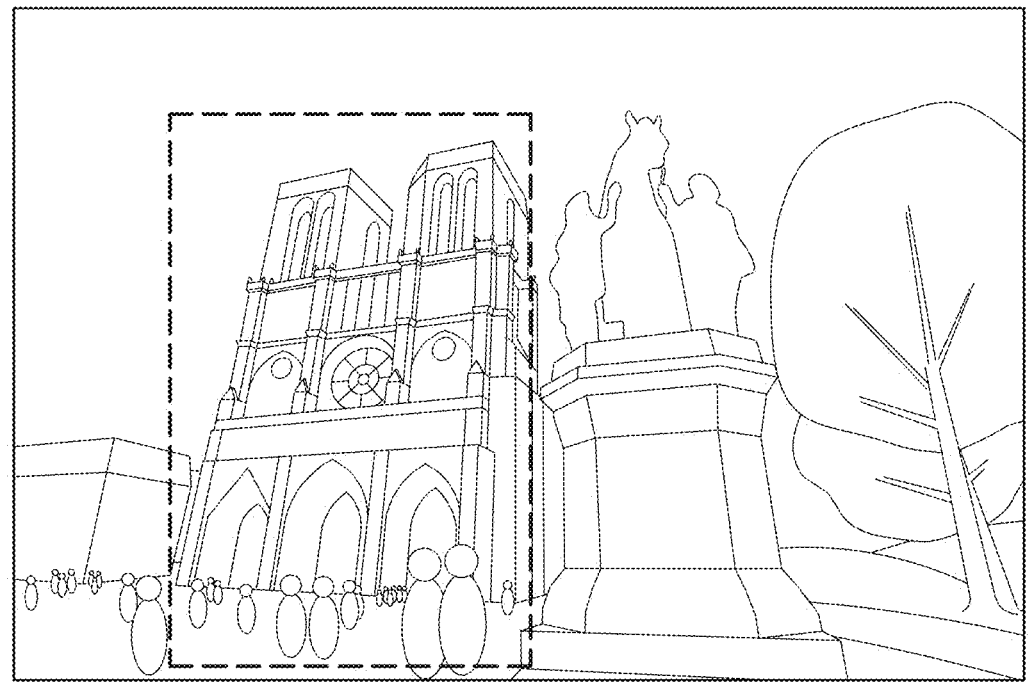
FIG. 11 is an illustration of an image captured by an ultra-wide-angle image capturing module.

The image captured by the ultra-wide-angle image capturing module 100a enjoys a feature of multiple imaged objects. FIG. 11 is an illustration of an image captured by the ultra-wide-angle image capturing module 100a.

Figure 12:
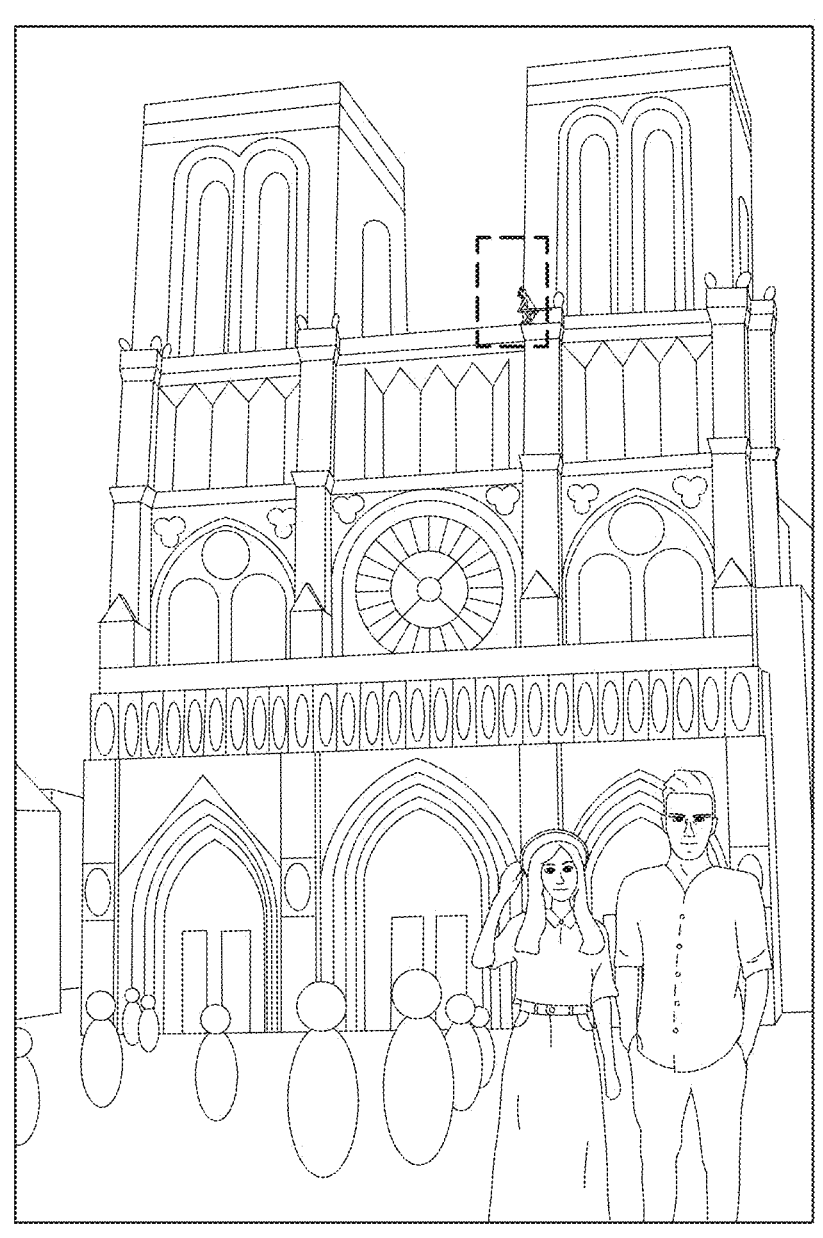
FIG. 12 is an illustration of an image captured by a high pixel image capturing module.

The image captured by the high pixel image capturing module 100b enjoys a feature of high resolution and less distortion, and the high pixel image capturing module 100b can capture part of the image in FIG. 11. FIG. 12 is an illustration of an image captured by the high pixel image capturing module 100b.

Figure 13:
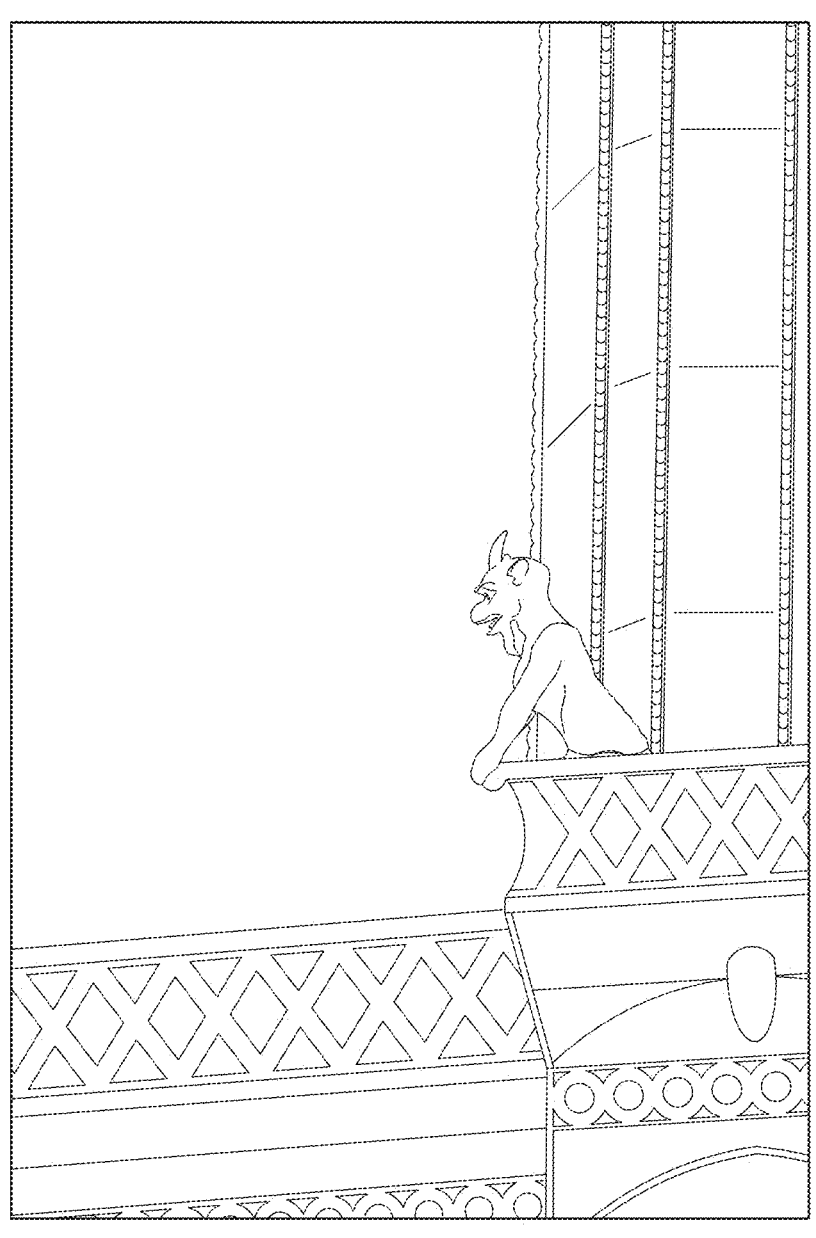
FIG. 13 is an illustration of an image captured by a telephoto image capturing module.

The image captured by the telephoto image capturing module 100c or 100d enjoys a feature of high optical magnification, and the telephoto image capturing module 100c or 100d can capture part of the image in FIG. 12. FIG. 13 is an illustration of an image captured by the telephoto image capturing module 100c or 100d. Moreover, the maximum field of view of the image capturing module corresponds to the field of view in FIG. 13.

When a user captures images of an object, the light rays converge in the ultra-wide-angle image capturing module 100a, the high pixel image capturing module 100b, the telephoto image capturing module 100c or the telephoto image capturing module 100d to generate images, and the flash module 201 is activated for light supplement. The focus assist module 202 detects the object distance of the imaged object to achieve fast auto focusing. The image signal processor 203 is configured to optimize the captured image to improve image quality and provided zooming function. The light beam emitted from the focus assist module 202 can be either conventional infrared or laser. The display module 204 can include a touch screen, and the user is able to interact with the display module 204 to adjust the angle of view and switch between different image capturing modules, and the image software processor having multiple functions to capture images and complete image processing. Alternatively, the user may capture images via a physical button. The image processed by the image software processor can be displayed on the display module 204.

The smartphone in the embodiment is only exemplary for showing the image capturing module of the present disclosure installed in an electronic device, and the present disclosure is not limited thereto. The image capturing module can be optionally applied to optical systems with a movable focus. Furthermore, the image capturing module features good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, panoramic view car cameras, dashboard cameras, vehicle backup cameras, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing module comprising:

an imaging lens system;

an image sensor located at an image side of the imaging lens system, and the image sensor having a photosensitive area disposed corresponding to the imaging lens system;

a first circuit board, wherein the image sensor is disposed on the first circuit board;

at least three passive components disposed on the first circuit board, and each of the at least three passive components having a first lead and a second lead; and a second circuit board disposed corresponding to the first circuit board, and the second circuit board comprising a connector and a plurality of circuits that are electrically connected to the connector;

wherein the first leads of the at least three passive components and the image sensor are electrically connected and together disposed on the first circuit board, the second leads of the at least three passive components form at least one contact on the first circuit board, a number of the at least one contact is less than a number of the at least three passive components, and the at least one contact is electrically connected to at least one of the plurality of circuits of the second circuit board.

2. The image capturing module of claim 1, wherein the number of the at least one contact is one.

3. The image capturing module of claim 1, wherein the second leads of the at least three passive components are grounded on the first circuit board.

4. The image capturing module of claim 3, wherein the second circuit board further comprises a stiffener, the stiffener and the connector are disposed on opposite surfaces of the second circuit board, and the connector is disposed on a surface of the second circuit board that corresponds to the first circuit board.

5. An electronic device comprising:

the image capturing module of claim 1.

6. An image capturing module comprising:

an imaging lens system;

an image sensor located at an image side of the imaging lens system, and the image sensor having a photosensitive area disposed corresponding to the imaging lens system;

a first circuit board, wherein the image sensor is disposed on the first circuit board;

at least three electronic components disposed on the first circuit board, and each of the at least three electronic components having a first lead and a second lead; and a second circuit board disposed corresponding to the first circuit board, and the second circuit board comprises a connector and a plurality of circuits that are electrically connected to the connector;

wherein the first leads of the at least three electronic components and the image sensor are electrically connected and together disposed on the first circuit board, the second leads of the at least three electronic components form at least one contact on the first circuit board, a number of the at least one contact is less than a number of the at least three electronic components, and the at least one contact is electrically connected to at least one of the plurality of circuits of the second circuit board.

7. The image capturing module of claim 6, wherein the number of the at least one contact is one.

8. The image capturing module of claim 6, wherein the second leads of the at least three electronic components are grounded on the first circuit board.

9. The image capturing module of claim 8, wherein the second circuit board further comprises a stiffener, the stiffener and the connector are disposed on opposite surfaces of the second circuit board, and the connector is disposed on a surface of the second circuit board that corresponds to the first circuit board.

10. An electronic device comprising:

the image capturing module of claim 6.

* * * * *